United States Patent
Carson et al.

(10) Patent No.: US 7,447,239 B2
(45) Date of Patent: Nov. 4, 2008

(54) TRANSMISSION PATH MONITORING (75) Inventors: Mark Carson, Belfast (GB); William Smith, Ballynahinch (GB); James Kearney, Moira (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1055 days.

(21) Appl. No.: 10/247,172

(22) Filed: Sep. 19, 2002

(65) Prior Publication Data
US 2004/0066750 A1 Apr. 8, 2004

(51) Int. Cl.
H04J 3/06 (2006.01)
(52) U.S. Cl. ............... 370/509; 370/395.51; 370/395.3; 370/395.61; 370/395.63; 370/389; 370/410; 370/442; 709/239; 709/245; 709/224
(58) Field of Classification Search ................... 370/242
See application file for complete search history.

(56) References Cited

U.S. PATENT DOCUMENTS

| | | | | | |
|---|---|---|---|---|---|
| 5,471,476 | A | * | 11/1995 | Hiramoto | 370/516 |
| 5,555,248 | A | * | 9/1996 | Sugawara | 714/704 |
| 5,717,693 | A | * | 2/1998 | Baydar et al. | 370/514 |
| 5,859,882 | A | * | 1/1999 | Urbansky | 375/375 |
| 5,923,653 | A | * | 7/1999 | Denton | 370/375 |
| 6,778,547 | B1 | * | 8/2004 | Merchant | 370/422 |
| 6,859,453 | B1 | * | 2/2005 | Pick et al. | 370/358 |
| 7,162,536 | B1 | * | 1/2007 | Roberts et al. | 709/237 |
| 7,200,157 | B1 | * | 4/2007 | Hessler et al. | 370/509 |
| 2003/0097472 | A1 | * | 5/2003 | Brissette | 709/245 |
| 2003/0120799 | A1 | * | 6/2003 | Lahav et al. | 709/236 |
| 2003/0120984 | A1 | * | 6/2003 | Chuah et al. | 714/716 |
| 2003/0189925 | A1 | * | 10/2003 | Wellbaum et al. | 370/372 |
| 2004/0184489 | A1 | | 9/2004 | Brissette et al. | |

FOREIGN PATENT DOCUMENTS

WO   WO 94/13073   6/1994

OTHER PUBLICATIONS

Andrew Schmitt, "Overhead transparency improves interoperability of optical networks", Aug. 2000, Lightwave, vol. 17, Issue 9.*
Agilent Technologies, "An overview of ITU-T G.709", Sep. 2001. □□<http://cp.literature.agilent.com/litweb/pdf/5988-3655EN.pdf>.*

* cited by examiner

*Primary Examiner*—Chi H Pham
*Assistant Examiner*—Raj K Jain
(74) *Attorney, Agent, or Firm*—Barnes & Thornburg LLP (57) ABSTRACT

One aspect of the invention provides an ingress apparatus comprising a signal processing apparatus for receiving an incoming data frame and locating the position of path overhead, and a monitoring apparatus arranged to extract information from the located path overhead. The ingress apparatus further includes an insertion apparatus for receiving, from the monitoring apparatus, information extracted from the path overhead of one or more signal path, and being further arranged to insert the extracted information into a respective data frame component which occupies a fixed position in a data frame. Thus, information which would normally occupy a non-fixed position in a data frame is moved to a fixed position. As a result, the information can subsequently be accessed without having to employ relatively complex apparatus for locating information which occupies a non-fixed position.

17 Claims, 4 Drawing Sheets

TRANSMISSION PATH MONITORING

FIELD OF THE INVENTION

The present invention relates to transmission path monitoring. The invention relates particularly, but not exclusively, to Tandem Connection Monitoring (TCM).

BACKGROUND TO THE INVENTION

In a synchronous communications network or system, such as a Synchronous Digital Hierarchy (SDH) or SONET transmission network, traffic data signals are transported across the network via transmission paths, or signal paths. A path may comprise a number of sections, each section comprising a transport service between two adjacent nodes of the network. Each network node typically comprises a network element in the form of a synchronous transmission apparatus, such as a multiplexer, a cross-connect or other network equipment. Each path has an associated path overhead (POH) which carries information enabling network elements to monitor the transmission of the traffic signal on the path and to perform, for example, error monitoring or performance monitoring checks.

Monitoring path overhead normally requires relatively complicated signal processing, usually including what is commonly known as pointer processing. Apparatus for performing such signal processing, including pointer processing apparatus, is normally provided at the signal input, or ingress, of a network element. Hence, in a network element the point of ingress of a data signal is normally considered to be the most convenient place at which to monitor the path overhead associated with the data signal.

However, conventional path protection schemes can result in a data signal arriving at a network element on one of two or more paths, and therefore at one of two or more ingresses. In accordance with conventional path protection techniques, the network element selects one or other of these paths as the "active" signal path. Clearly, it would be inappropriate to monitor the path overhead at one ingress if the selected data signal was in fact arriving at another ingress. This is a particular problem in cases where the network element comprises an intermediate node in the path to the signal's destination. In such cases, the data signal which is output from the network element via a particular output, or egress, is selected from one of two or more ingresses, depending on what path protection switching may have taken place. It is therefore preferable to monitor path overhead at the egress to ensure that the path overhead associated with the selected, or active, signal path is monitored.

By way of example, in some circumstances it is important to be able to perform what is known generally as intermediate path performance monitoring (IPPM) whereby the quality/performance of only a portion of a signal path is monitored. Another performance monitoring scheme is known as Tandem Connection Monitoring (TCM) and is defined in International Telecommunications Union Telecommunications Section (ITU-T) standard G.707/Y.1322 dated October 2000 (particularly Appendices C and D) which is hereby incorporated herein by way of reference. Normally, under TCM, when a traffic signal enters a first network element that marks the beginning of a path portion over which intermediate monitoring is required, one or more error, or performance, measurements are made at the ingress where the traffic signal is received. Corresponding error/performance measurements are then taken at the egress of a second network element that marks the end of the path portion. The difference between the error measurements taken at the ingress of the first network element and the egress of the second network element is used as a measure of the performance of the network portion between the first and second network elements.

There is a problem, however, with monitoring path overhead at an egress of a network element. The necessary signal processing apparatus, including pointer interpretation apparatus and normally pointer processing apparatus, is normally only provided at the ingresses of a network element. Since such processing apparatus is relatively expensive in terms of both cost and area, it is considered undesirable also to provide signal processing apparatus for monitoring path overhead at the egresses of a network element.

SUMMARY OF THE INVENTION

A first aspect of the invention provides a network element comprising an ingress apparatus for receiving a data signal, the data signal being comprised of data frames, each data frame comprising one or more payload data structure for providing a respective signal path, and respective path overhead associated with the or each signal path, the ingress apparatus comprising: a signal processing apparatus arranged to receive an incoming data frame and to locate the position of the path overhead in the incoming data frame in respect of the or each signal path; and a monitoring apparatus arranged to extract information from the path overhead located by the signal processing apparatus, wherein the ingress apparatus further includes an insertion apparatus arranged to receive, from said monitoring apparatus, information extracted from the path overhead of one or more signal path, and being further arranged to insert said extracted information, or information derived therefrom, into a respective data frame component which occupies a fixed position in a data frame.

Thus, information which would normally occupy a non-fixed position in a data frame is moved to a fixed position. As a result, the information can subsequently be monitored by other components of the network element, for example at an egress, without having to employ relatively complex signal processing apparatus such as pointer interpretation or pointer processing apparatus.

In the preferred embodiment, the signal processing apparatus comprises pointer processing apparatus including pointer interpretation apparatus. Preferably, the pointer processing apparatus is arranged to create a new data frame for onward transmission of said data signal, the insertion apparatus being arranged to insert said extracted information, or information derived therefrom, into a component of said new data frame which occupies a fixed position in said new data frame.

In the preferred embodiment, the monitoring apparatus comprises an apparatus arranged to perform a TCM (Tandem Connection Monitoring) Sink function. Preferably, the information provided to the insertion apparatus by the monitoring apparatus comprises performance data.

Preferably, the insertion apparatus is arranged to insert said extracted information, or information derived therefrom, into overhead which occupies a fixed position in the frame, such as Section Overhead, Transport overhead, or equivalent.

In the preferred embodiment, the insertion apparatus comprises a respective memory location for each signal path in a received data signal, and a multi-to-1 selector switch arranged to insert the value contained in a selected one of said memory locations into said fixed data frame component. The insertion apparatus preferably further includes a counter operable by a timing signal synchronised to the timing of the data frame into which the insertion apparatus is required to insert information, the counter being arranged to provide a control signal to said multi-to-1 selector switch for controlling which of said memory locations is selected.

The network element typically further includes an egress apparatus arranged to receive data frames from said ingress apparatus. The egress apparatus includes an extraction apparatus arranged to extract the information inserted into data frame components by said ingress apparatus.

Preferably, the extraction apparatus comprises a respective memory location for each signal path in a received data signal, the extraction apparatus being arranged to store the information extracted from received data frames in a respective memory location corresponding to the signal path to which the extracted information relates. Preferably, the extraction apparatus is arranged to accumulate the extracted information in respect of one or more signal paths over a fixed period by adding successive instances of extracted information to the respective memory location during said fixed period.

A second aspect of the invention provides an ingress apparatus as defined in respect of the network element of the first aspect of the invention.

A third aspect of the invention provides a transport network comprising a network element according to the first aspect of the invention.

A fourth aspect of the invention provides a method of transmitting within a network element information derived from path overhead, the method comprising receiving an incoming data frame; locating the position of the path overhead in the incoming data frame in respect of the or each signal path; extracting information from the path overhead of one or more signal path; and inserting said extracted information, or information derived therefrom, into a respective data frame component which occupies a fixed position in a data frame.

A fifth aspect of the invention provides a computer program product comprising computer useable instructions for causing a network element to perform the method of the fourth aspect of the invention.

A sixth aspect of the invention provides a network element comprising an ingress apparatus for receiving a data signal, the data signal being comprised of data frames, each data frame comprising one or more component which occupies a non-fixed position with respect to the data frame, and one or more component which occupies a fixed position with respect to the data frame, the ingress apparatus being arranged to locate the position of at least one non-fixed component of an incoming data frame and to extract information from said at least one non-fixed component, wherein the ingress apparatus is further arranged to insert said extracted information, or information derived therefrom, into at least one fixed component of a data frame.

A seventh aspect of the invention provides a method of transmitting within the network element information derived from at least one non-fixed data frame component, the method comprising: locating the position of at least one non-fixed component of an incoming data frame; extracting information from said at least one non-fixed component; and inserting said extracted information, or information derived therefrom, into at least one fixed component of a data frame.

Other advantageous aspects and features of the invention will be apparent to those ordinarily skilled in the art upon review of the following description of a specific embodiment of the invention and with reference to the accompanying drawings.

The preferred features as described herein above or as described by the dependent claims filed herewith may be combined as appropriate, and may be combined with any of the aspects of the invention as described herein above or by the independent claims filed herewith, as would be apparent to those skilled in the art

BRIEF DESCRIPTION OF THE DRAWINGS

A specific embodiment of the invention is now described by way of example and with reference to the accompanying drawings in which.

DETAILED DESCRIPTION OF THE DRAWINGS

Figure 1:
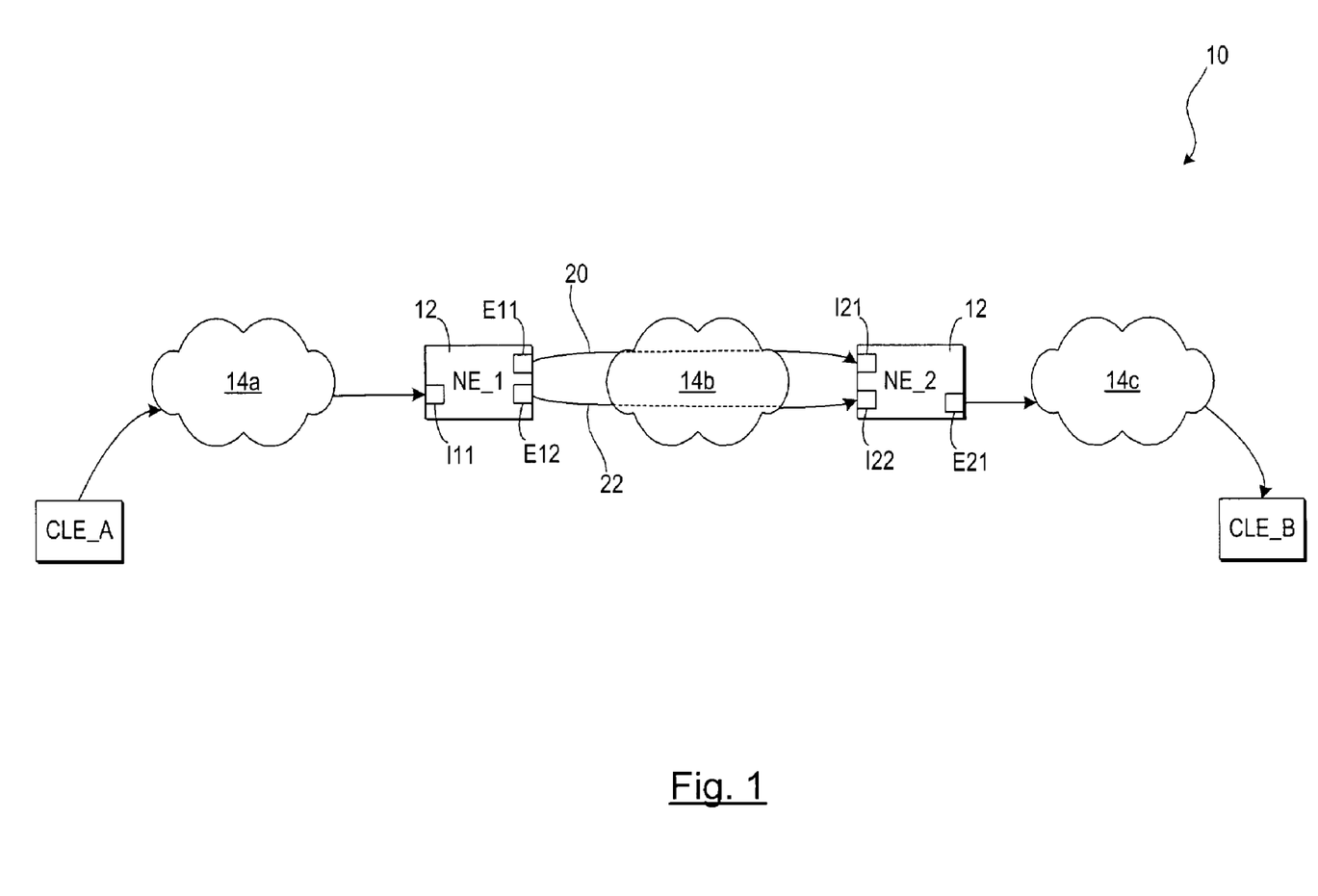
FIG. 1 is a schematic view of a communications network.

FIG. 1 of the drawings shows, generally indicated at 10, a schematic view of transport network comprising a plurality of network elements 12 (only two shown: NE_1, NE_2) in communication with one another via a network infrastructure which is represented in FIG. 1 by network portions 14*a*, 14*b*, 14*c*. The network portions 14*a*, 14*b*, 14*c* typically comprise further network elements, and/or sub-networks, arranged in conventional network configurations such as ring configuration, hub configuration, mesh configuration, point-to-point configuration, or a combination thereof. The network elements, which may alternatively be referred to as network nodes or network entities, typically comprise network equipment such as a multiplexer, a regenerator, or a cross-connect (not shown). In the preferred embodiment, the network 10 comprises a synchronous transport network, or synchronous transmission system, such as a SONET (Synchronous Optical Network) and/or SDH (Synchronous Digital Hierarchy) network. In this case, the network equipment may be referred to as synchronous transmission apparatus.

A synchronous transport network is arranged to transport data signals, commonly referred to as traffic, arranged in accordance with a data frame structure. There are a number of standard frame structures defined by, for example, ITU-T (International Telecommunications Union-Telecommunications standardization sector) and Bellcore (now known as Telcordia), that are commonly used in synchronous transmission systems. In SDH and SONET transmission systems, data signals are packaged into frames known as Synchronous Transport Modules (STMs) and Synchronous Transport Signals (STSs) respectively. An STM frame comprises a payload area, an AU pointer area and a section overhead (SOH) area. In the payload area data signals are mapped into containers, commonly referred to as Virtual Containers (VCs) in SDH terminology. In SONET, the frame structure is substantially similar although the terminology differs, as is well known. For example, the SONET equivalent of section overhead is transport overhead (TOH) and, in SONET, containers are known as synchronous payload envelopes (SPEs). Each container, or envelope, also comprises additional data known as the path overhead (POH). The payload data (i.e. the data carried in the payload area) comprises the main information that it is desired to transport across the network e.g. audio and/or visual data, while the path overhead data is normally used to carry information for use in end-to-end management of a path taken by the relevant data signal(s) across the network. Within the payload area, some containers (known in SDH as low order data structures) may be nested inside larger containers (known in SDH as high order data structures). Both low order and high order data structures normally comprise path overhead.

Further control information, known in SDH as the section overhead (SOH), or equivalent overhead, is added to the frame. The normal purpose of the section overhead is to provide communication channels between adjacent network elements for functions including operations, administration and maintenance (OA&M) facilities, protection switching, section performance and frame alignment.

Figure 2:
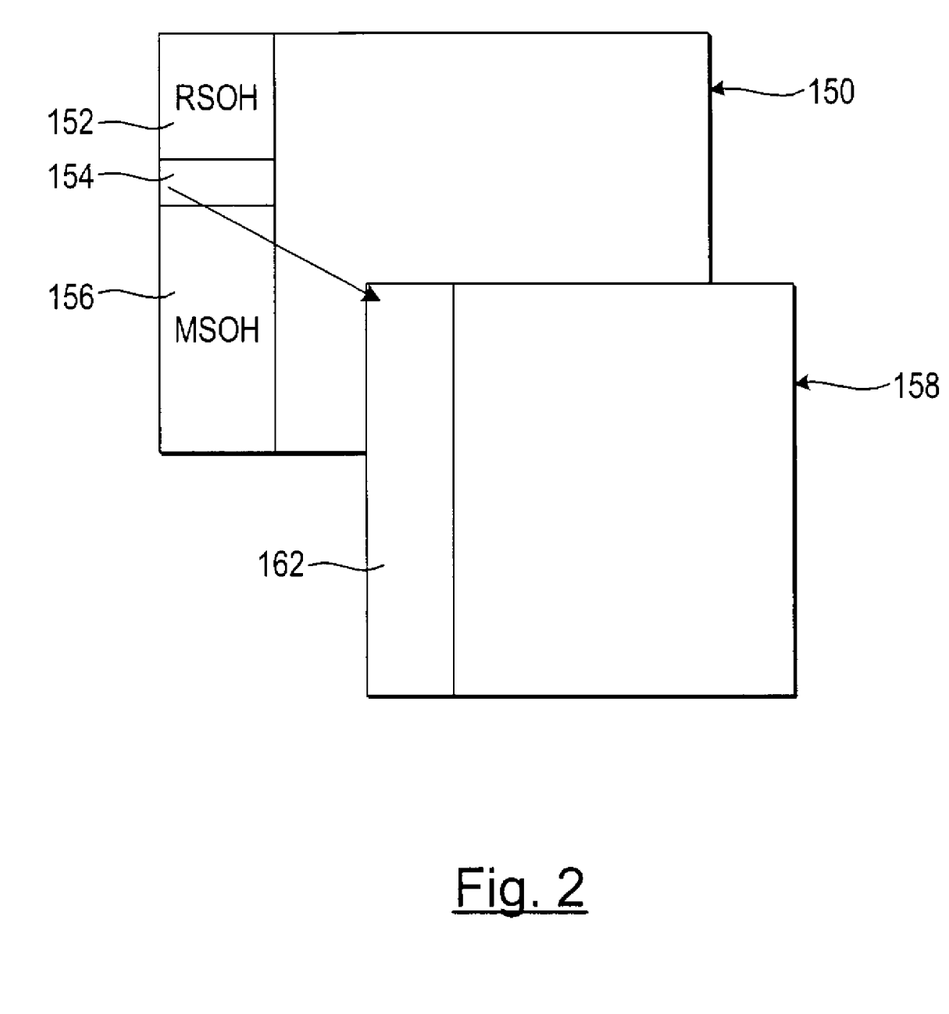
FIG. 2 is a representation of an STM data frame.

FIG. 2 shows a representation of an STM data frame. In particular, FIG. 2 shows, by way of example only, a representation of an SDH STM-1 data frame 150 including Regenerator section overhead (RSOH) 152, AU pointers 154, Multiplex section overhead (MSOH) 156, a VC-4 payload 158 and associated path overhead 162. The section overhead 152, 156 occupies a fixed position with respect to the data frame 150. In contrast, the path overhead 162 does not occupy a fixed position within the data frame 150. The position of the path overhead 162 is determined by the value of the AU pointers 154. Therefore, in order to examine the path overhead 162 associated with a signal path, it is necessary first to locate the path overhead. Accordingly, some conventional signal processing operations are normally performed upon receipt of a data signal at a network element. The signal processing operation used to locate the position of incoming data, including path overhead 162, is commonly known as pointer interpretation. Pointer interpretation is normally performed as part of a set of operations commonly known as pointer processing. The composition of SDH/SONET data frame structures, and pointer processing operations, are well known and are described in ITU-T standard G.707 and Telcordia GR253 respectively. Further equivalent standards include ATIS T1.105 and ETSI ETS 300 147.

Referring again to FIG. 1, there is also shown first customer location equipment CLE_A which is capable of communication with second customer location equipment CLE_B across network 10. The customer location equipment (CLE), which may alternatively be referred to as an End System, comprises any conventional equipment comprising, in the preferred embodiment, an SDH and/or SONET interface and which is capable of serving as a source of and/or a destination for data signals. For illustrative purposes, it is assumed that CLE_A creates a data signal and sends it across network 10 to CLE_B in conventional manner. The data signal is transported across network 10 on a signal path through network portions 14a, 14b, 14c and network elements NE_1, NE_2. For the purposes of illustration only, it is assumed that the network 10 comprises an SDH network and that data signals are carried by SDH data structures. Hence, the signal path is provided by Virtual Containers, for example VC-4s, and is associated with path overhead (POH) as illustrated in FIG. 2.

The information carried by the path overhead is commonly used to monitor performance. For example, the path overhead of an SDH VC-4 container comprises a byte known as the B3 byte which is used to provide bit error monitoring over a transmission path using an even bit parity code, BIP-8. Hence, for a signal path created at CLE_A and terminated at CLE_B, the contents of the B3 byte may be used to access the quality/performance of the signal path from CLE_A to CLE_B. In some cases, however, it is desirable to be able to measure the performance of only part of a path from source to destination. In the present example, it is assumed that it is desired to monitor the performance of the portion of the signal path which begins at network element NE_1 and ends at network element NE_2. It is also assumed that a conventional path protection scheme is established between NE_1 and NE_2 such that the data signal may be transported from NE_1 to NE_2 on a main path 20, or a stand-by path 22, or both.

A data signal is received by a network element 12 at an input, or ingress, and is transmitted from the network element 12 via an output, or egress. In FIG. 1, the data signal which emanates from CLE_A is received by NE_1 on ingress I11 and is transmitted from NE_1 on both egresses E11 and E12. NE_2 receives the data signal on ingress I21 and/or I22 and, in accordance with whatever conventional path protection scheme is operating, selects to output from egress E21 either the data signal received on I21 or I22.

As described above, in order to measure the performance of the signal path between NE_1 and NE_2, it is preferred that one or more performance measurements are recorded at ingress I11 of NE_1 and at egress E21 of NE_2. The difference between the respective performance measures at I11 and E21 being indicative of the quality of the path between NE_1 and NE_2.

Figure 3:
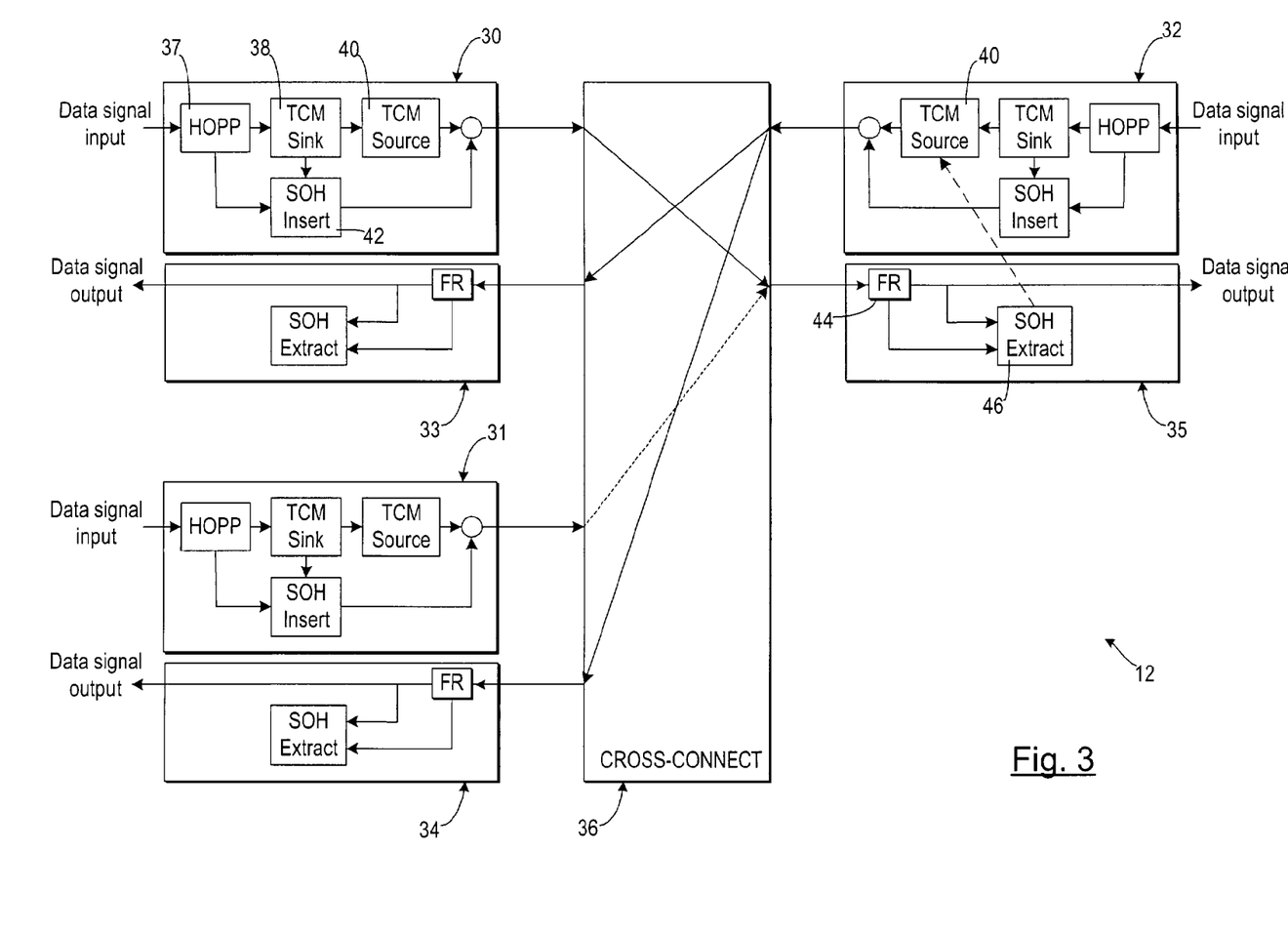
FIG. 3 is a block diagram of a network element comprising ingress apparatus and egress apparatus arranged in accordance with a preferred embodiment of the invention.

FIG. 3 shows a schematic view of a network element 12 comprising ingress apparatus 30, 31, 32, egress apparatus 33, 34, 35 and cross-connect apparatus 36. The network element 12 is generally conventional in configuration and may be provided in hardware, software or a combination of both, as is well known. The network element 12 may have any number of ingresses and egresses and may comprise a respective ingress apparatus and egress apparatus for each ingress and egress respectively. For illustration purposes, however, it is assumed that the network element 12 illustrated in FIG. 3 represents NE_2 of FIG. 2 and so has two ingress apparatus 30, 31 (corresponding to ingresses I21, I22 respectively) for receiving data signals from network portion 14b, and one egress apparatus 35 (corresponding to egress E21) for sending data signals to network portion 14c. It is also assumed that NE_2 is capable of bi-directional communication and so for each ingress apparatus 30, 31, there is a corresponding egress apparatus 33, 34, for sending data signals to network portion 14b, and for egress apparatus 35 there is a corresponding ingress apparatus 32. In FIG. 3, only those components of the network element 12 and the ingress/egress apparatus that are helpful for understanding the invention are shown. In FIG. 3, the cross-connect 36 is shown, for illustrative purposes only, as implementing the conventional path protection scheme referred to above whereby ingress apparatus 30, 31 are arranged to receive a data signal on separate signal paths (signal paths 20 and 22 respectively in the present example) and egress apparatus 35 is arranged selectably to output the data signal received by one or other of the ingress apparatus 30, 31. In the return direction, data signals received by ingress apparatus 32 are output by both egress apparatus 33, 34. In practice, the ingress apparatus 30, 31, 32 are typically included in what are commonly known as ingress ports, or ingress cards and the egress apparatus 33, 34, 35 are typically included in what are commonly known as egress ports, or egress cards.

The ingress apparatus 30, 31, 32 include respective signal processing apparatus conveniently in the form of conventional pointer processing apparatus 37 for performing conventional pointer processing operations on incoming data signals. It will be understood that in order to perform the invention, it is not necessary to perform all of the conventional pointer processing operations described in ITU-T G.707. Rather, it is only necessary to perform those operations which allow the position of data, and in particular the path overhead 162, to be located. Such operations are normally referred to as pointer interpretation and so, in an alternative embodiment, pointer processing apparatus 37 may be replaced with a pointer interpretation apparatus (not shown). In FIG. 3, the pointer processing apparatus 37 comprises conventional High Order Pointer Processing (HOPP) apparatus for performing what is commonly known in SDH terminology as AU alignment. AU alignment processes the AU pointers (not shown) contained in the AU pointer area 154 (FIG. 2) of a data frame in order to locate the high order payload 158 and, in particular, the path overhead 162. As is conventional, in order to align the incoming data signal to the local timing of the network element 12, the HOPP 37 creates a new data frame (sometimes known as a system data frame or an internal data frame) in which the received data signal can be transported through the network element 12. In the present example, it is assumed that the payload 158 comprises VC-4 or high order VC-3 containers and so it is only necessary to perform HOPP, or more particularly High Order Pointer Interpretation, to locate the path overhead 162 associated with the VC-4/VC-3 containers. It will be appreciated that the invention is also suitable for use with payloads comprising low order data structures, for example VC-12s, in which case further pointer processing, commonly known as Low Order Pointer Processing (LOPP) or TU alignment, is required to locate the path overhead of the low order containers. The additional processing apparatus which would be required to perform LOPP is not shown for reasons of clarity.

In the preferred embodiment, it is assumed that the intermediate performance monitoring between NE_1 and NE_2 is performed generally in accordance with TCM (Tandem Connection Monitoring) as specified in ITU-T standard G.707 (Appendices C and D). Hence, at the TCM Source monitoring point (which in the present example is at the ingress I11 of NE_1) a conventional apparatus (not shown) for performing a TCM source function is included in the ingress apparatus of NE1 corresponding to ingress I11. The TCM Source function is described in G.707 and involves the insertion of TCM overhead into the path overhead of the data signal. By way of example, the TCM overhead normally includes an error measurement taken from, for example, the B3 byte of the VC-4/VC-3 path overhead. The error measurement is normally inserted into the N1 byte of the path overhead. In accordance with ITU-T G.707, the error measurement taken from the B3 byte is inserted into bits 1-4 of the N1 byte and is referred to as the Incoming frame Error Count (IEC). In FIG. 3, the ingress apparatus 30, 31 are shown as having respective TCM Source apparatus 40 although such apparatus is only required if the respective ingress of the network element 12 may be required to serve as a TCM Source. In the present example wherein a TCM span is set up between NE_1 and NE2 as described, ingress apparatus 30, 31 are not required to serve as a TCM Source and so the TCM Source apparatus 40 is not essential at these ingress apparatus 30, 31.

At the TCM Sink point (which in the present example is at NE_2) an apparatus 38 for performing a TCM sink function is provided. The TCM sink apparatus 38 monitors the path overhead associated with the incoming data signal. In particular, the TCM sink apparatus 38 monitors and/or terminates the TCM path overhead that was inserted at the TCM source point. In addition, the TCM sink apparatus 38 makes corresponding performance measurements in respect of the incoming data signal for comparison with the respective measurements recorded in the N1 byte associated with the incoming signal. For example, the TCM sink apparatus 38 normally takes an error measurement from the B3 byte of the path overhead of the incoming signal. This error measurement represents the number of errors that have been detected in respect of the data signal from the signal source (which in the present example is CLE_A) to the local network element (which in the present example is NE_2). Typically, this error measurement comprises a frame error count, i.e. number of bit errors within a single frame (which is normally within the range 0 to 8 for high order payloads), taken at a TCM sink apparatus. This error measurement is hereinafter referred to as SK_FEC (signal frame error count at sink). The TCM sink apparatus 38 subtracts the value for IEC, as obtained from bits 1-4 of N1, from the measured value of SK_FEC. The result of the subtraction, which is hereinafter referred to as SEC (Span (or Section) Error Count), is a measure of the errors detected within the TCM span which, in the present example, is between NE_1 and NE_2. Typically, SEC is determined by the number of frame errors occurring within a single frame across the TCM span. The normal TCM source and sink functions as outlined above are described fully in ITU-T G.707.

In the present example, the desired TCM sink point is egress E21 of NE_2 and so it would normally be desirable to perform the TCM sink function at egress E21. However, since the TCM sink apparatus 38 is required to examine the path overhead of the incoming data signal, the data signal must undergo the relevant pointer processing before being provided to the TCM sink apparatus 38. Pointer processing apparatus 37 is normally provided at ingresses of a network element 12 but not at egresses. Because of the relatively large size and cost of pointer processing apparatus, it is considered undesirable to include additional pointer processing apparatus at egresses of network elements 12 for the purposes of intermediate path performance monitoring.

In the preferred embodiment of the invention, at the network element 12 which marks the end of the TCM span, each ingress apparatus which is arranged to receive a data signal in respect of which intermediate monitoring is required is provided with a respective TCM sink apparatus 38. In accordance with the preferred embodiment of the invention, these ingress apparatus are further provided with apparatus for inserting performance information, or performance data, which is provided by the respective TCM Sink apparatus, into a component or part of the data frame which carries the data signal from the ingress apparatus to an egress apparatus, which part occupies a fixed position in the data frame. Thus, in the present example, ingress apparatus 30, 31 each include a respective TCM sink apparatus 38 and a respective insertion apparatus 42. In the preferred embodiment, the insertion apparatus 42 is arranged to insert the performance information into the section overhead (SOH), or equivalent, of the data frame which carries the received data signal to the egress apparatus 35.

When a data signal is received by the ingress apparatus 30, 31, the pointer processing apparatus 37 processes the received data signal in conventional manner. The TCM Sink apparatus 38 is then able to examine the path overhead associated with the received data signal. In particular, the TCM Sink apparatus 38 examines the TCM overhead and extracts the value for IEC (which in the present example is contained in the N1 byte) which was inserted at the TCM Source (which in the present example is at I11 of NE_1). The TCM Sink apparatus 38 also determines from the path overhead a value for SK_FEC (which in the present example is obtained from the B3 byte) and subtracts the value for IEC from the measured value of SK_FEC to produce a value for Span Error Count SEC. In accordance with the preferred embodiment of the invention, the TCM Sink apparatus 38 is arranged to provide the value for SEC to the insertion apparatus 42. The insertion apparatus 42 is arranged to insert the value for SEC into any convenient spare or redundant space in the section overhead of the new data frame created by the pointer processing apparatus 37. By way of example, in SDH any of bytes from D4 to D12 of the MSOH 156 (FIG. 2) and any of the corresponding bytes in subsequent STS's of an STM frame may be used to carry the SEC value. In the present example it is assumed for illustration purposes that the insertion apparatus 42 is arranged to insert performance information into section overhead beginning at the D5 byte. The timing of the insertion apparatus 42 is conveniently controlled by the pointer processing apparatus 37, although it may equally be synchronised to the local timing of network element 12 by any other suitable means (for example a simple row and column counting apparatus (not shown) arranged to synchronise counting to a framing signal).

Both ingress apparatus 30, 31 perform the operations described above in respect of their respective received data signals. Depending on which path 20, 22 is selected, the respective data signal, including the performance information inserted by the respective insertion apparatus 42, from one or other of ingress apparatus 30, 31 is sent to egress apparatus 35. Since the performance information occupies a fixed position with respect to the data frames received by egress apparatus 35, egress apparatus 35 does not require pointer processing apparatus in order to locate the performance information. Rather, the performance information can conveniently be located by identifying the start of an incoming data frame and then counting an appropriate number of bytes and/or bits until the byte(s) or bits containing the performance information is received. In the preferred embodiment, the egress apparatus 35 is provided with a conventional framing apparatus 44, or framer, for performing a conventional framing function which detects the start of a data frame. In SDH, this is normally achieved by detecting the A1 byte in the section overhead of the incoming frame, or from a central timing source using a local timing signal. The egress apparatus is further provided with an extraction apparatus 46 for extracting the performance information from the data signal received at the egress apparatus 35. In the preferred embodiment, the extraction apparatus 46 is arranged to receive from the framer 44 a signal indicating the start of a data frame. The extraction apparatus 46 then counts an appropriate number of bytes and/or bits until the performance information is received. Assuming, by way of example only, that the performance information comprises the value for SEC contained in the first four bits of D5 in section overhead, the extraction apparatus 46 counts until the D5 byte arrives and extracts the following four bits of information as the value for SEC.

Figure 4:
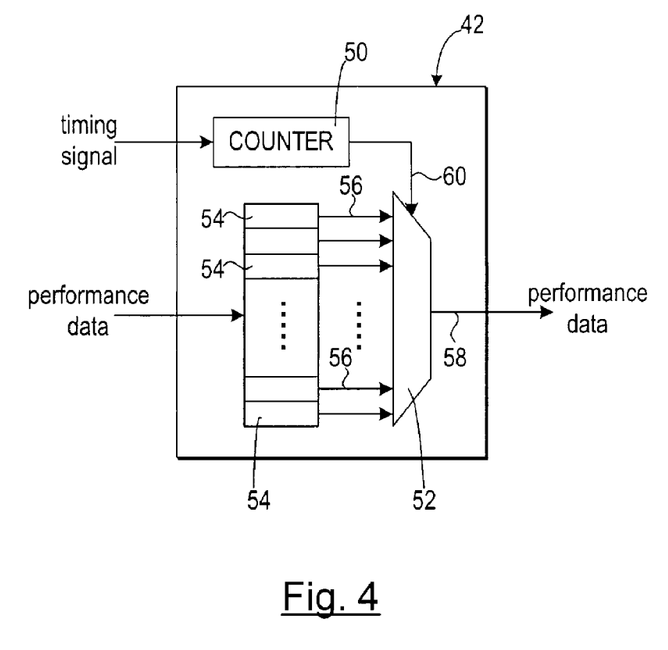
FIG. 4 is a block diagram of an insertion apparatus included in the ingress apparatus of FIG. 3.
Figure 5:
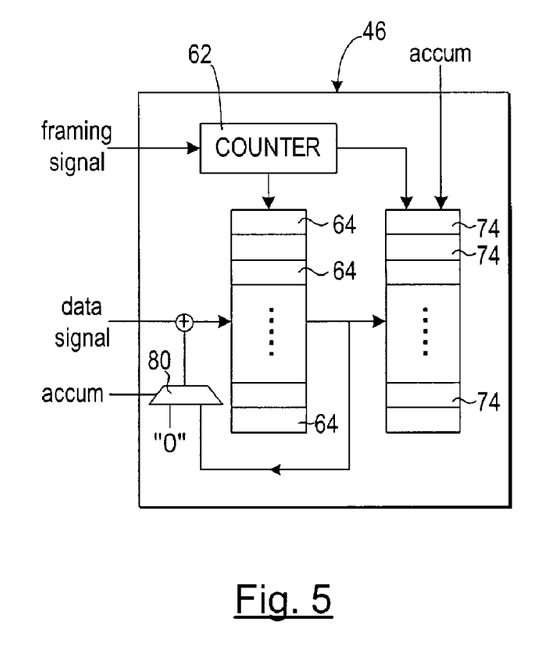
FIG. 5 is a block diagram of an extraction apparatus included in the egress apparatus of FIG. 3.

FIGS. 4 and 5 respectively illustrate preferred embodiments of the insertion apparatus 42 and extraction apparatus 46 in more detail. Referring to FIG. 4, the insertion apparatus 42 comprises a counter 50, a multi-to-1 selector switch 52 and one or more data memory locations conveniently in the form of data registers 54. The selector switch 52 has a plurality of inputs 56 and one output 58, one of said inputs 56 being selected to provide the output 58 of the switch 52 depending on the setting of a control input 60. The counter 50 is operable by a timing signal conveniently provided by the pointer processing apparatus 37, or other suitable local timing signal. The timing signal synchronises counter 50 to the timing of the new data frame and allows the counter 50 to co-ordinate insertion of performance information into section overhead of the new data frame. The output of the counter 50 provides a control signal to the control input 60 of switch 52 for determining which input 56 to the switch 52 is selected as output 58. The data registers 54 are arranged to receive performance information, or data, from the TCM sink apparatus 38.

In the foregoing description, it is assumed for reasons of simplicity that the data signal being transmitted across the network 10 and in respect of which TCM monitoring is required comprises STM-1 data frames 150 which in turn each comprise a VC-4 payload 158 (FIG. 2). In such a case, the data signal comprises only one data path as provided by the VC-4 structure and one corresponding path overhead 162. For processing data signals of this nature, only one data register 54 is required in the insertion apparatus 42. In practice, however, the data signal transmitted across the network 10 may comprise a plurality of smaller data signals, each smaller data signal being carried on a respective signal path, each signal path being associated with respective path overhead. For example, in SDH the data frame structure is generally referred to as STM-N, where N=0, 1, 4, 16 or 64. In an STM-4 data frame there are four VC-4 paths, in an STM-16 data frame there are 16 VC-4 paths and so on. So, by way of example, if the ingress apparatus 30, 31 receive a data signal comprising STM-16 data frames, then up to 16 VC-4 signal paths may be received, in respect of each of which performance monitoring may be required. In order to accommodate incoming data signals which comprise more than one signal path, the insertion apparatus 42 of the preferred embodiment comprises a plurality of data registers 54, one for each signal path which is contained, or may be contained, in an incoming data signal. Hence, the insertion apparatus 42 can deal with multi-path data signals, such as STM-4 or STM-16, or single path data signals, such as STM-1. The TCM Sink apparatus 38 is arranged to provide performance data in respect of each signal path (extracted from the respective path overhead as described above) to the insertion apparatus 42 whereupon the performance data is stored in a respective data register 54 for each signal path. To this end, the TCM Sink apparatus 38 conveniently provides the insertion apparatus 42 not only with the performance data, but also with a write address signal (not shown) for determining into which data register 54 the associated performance data is to be written, and a write enable signal (not shown) for indicating that the associated performance data is valid. The write address signal may conveniently comprise an indication of the channel or path with which the performance data is associated. In the preferred embodiment, the span error count SEC is calculated, as described above, by the TCM Sink apparatus 38 per frame of the incoming data signal in respect of the or each signal path contained in the data signal. The per frame SECs are then provided to the insertion apparatus 42 and stored in a respective data register 54 for communication to the egress apparatus 35. If required, the respective SECs may be accumulated over, for example, a one second period for each signal path and reported locally.

Each data register 54 should be at least large enough to contain the performance information which it is desired to communicate to the egress apparatus 35 in respect of each signal path. In the preferred embodiment, the performance information includes the SEC value which normally can be stored in 4 or more bits. Depending on the performance monitoring that is required, it may be necessary to gather additional performance information. For example, in accordance with ITU-T G.707, the TCM overhead includes, as well as the IEC (in bits 1-4 of N1); a remote error indication (TC-REI) in bit 5 of N1; a reverse error indicator (OEI) in bit 6 of N1; and a 76 frame multiframe in bits 7 and 8 containing a 16 byte path trace (TC_API (Tandem Connection Access Point Identifier), a remote defect indicator (TC-RDI) and a remote defect indicator (ODI). Depending on the requirements of the application, some or all of the above-identified performance information, or derivatives thereof e.g. SEC, may be provided by the TCM Sink apparatus 38 to the insertion apparatus 42 for insertion into section overhead. Preferably, the data registers 54 are at least one byte in size to accommodate performance information of up to at least one byte. In the preferred embodiment, the data registers 54 comprise one byte of which 5 bits are used to hold a value for SEC, 1 bit is used for TC-RDI, 1 bit is used for ODI and 1 bit for OEI.

The insertion apparatus 42 is arranged to insert the respective performance information, including the respective value for SEC, into the section overhead of the data frame created at the ingress apparatus 30, 31. Assuming, for example, that the performance information contains up to one byte of data, then the insertion apparatus 42 inserts the performance information into a respective byte of section overhead. Preferably, where the incoming data signal comprises more than one signal path, the performance data for successive signal paths is placed into successive locations in section overhead. In the present example, assuming that one byte per path is used to carry the performance information and that the performance information in respect of the first path is placed in D5, then the performance information in respect of subsequent paths is placed in subsequent successive bytes. The operation of the insertion apparatus 42 is synchronised to the creation of the data frame by the ingress apparatus 30, 31 by operating counter 50 using a timing signal synchronised to the local frame timing signal. This timing signal may conveniently be provided by the pointer processing apparatus 37 as shown in FIG. 3 but may alternatively be provided by any other suitable means.

A preferred embodiment of the extraction apparatus 46 is illustrated in FIG. 5. The extraction apparatus 46 comprises a counter 62 and one or more data memory locations conveniently in the form of data registers 64.

For reasons similar to those described above in relation to FIG. 4, it is preferred that the extraction apparatus 64 comprises a plurality of data registers 64, one in respect of each signal path which is contained, or may be contained, in a received data signal. As for the insertion apparatus 42, the size of the data registers 64 depends on the amount of performance information that they are required to store. In one embodiment, the data registers 64 may one byte in size. In the preferred embodiment, each data register 64 is two bytes in size to allow for the calculation of accumulated errors, as is described in more detail below. The counter 62 is arranged to control the writing of data into the registers 64.

The counter 62 is arranged to receive a timing signal in the form of a framing signal, conveniently from framer 44, for indicating the start of a data frame being received at the egress apparatus 35. The extraction apparatus 46 is also arranged to receive the data frame and selectably to write one or more components of the data frame into a data register 64 under the control of counter 62. In the present example, the framer 44 signals to counter 62 upon receipt of the A1 byte of an incoming data frame. The incoming data frame is provided to the extraction apparatus 46 in synchronism with its receipt at the framer 44. Upon receipt of the framing signal, counter 62 counts an appropriate number of cycles, or bytes, corresponding to the relative position of the performance information in section overhead with respect to the start of the data frame, i.e. the A1 byte. When the counter 62 reaches the appropriate count, the first component of section overhead which contains the performance information is being received by the extraction apparatus 46 and so counter 62 causes that component of section overhead to be written into a respective data register 64, conveniently the first data register 64. In the preferred embodiment, the performance information is added to the contents of the respective data register 64 rather than overwriting the contents. This allows an accumulation function to be carried out as is explained in more detail below. In the present example in which the performance information for each signal path is contained in respective consecutive bytes of section overhead beginning with the D5 byte, upon receipt of the framing signal, counter 62 counts bytes until the D5 byte is received at the extraction apparatus 46 whereupon the D5 byte is written to, or added to, the first data register 64. Subsequent successive bytes, which contain performance information relating to the other signal paths carried by the data frame, are written into, or added to, respective, preferably successive, data registers 64. Thus, after a data frame has been received by the egress apparatus 35, the data registers 64 contain the respective performance information relating to respective signal paths carried by the data frame.

In the preferred embodiment, the extraction apparatus 46 is arranged to accumulate per frame performance information over a fixed period. To this end, the extraction apparatus 46 includes a second set of one or more data registers 74, or other data memory locations, for storing accumulated performance information in respect of the or each path in the received data signal. In the assumption that the received data signal commonly comprises more than one signal path, the extraction apparatus 46 includes a plurality of data registers 74, one in respect of each path which may be included in the received data signal. In the preferred embodiment where it is assumed that the performance information comprises one byte of data, each data register 74 is larger, say, two bytes long, to allow for accumulation of performance data. The data registers 74 are arranged to receive a write address signal, conveniently from counter 62 in similar fashion to data registers 64. The data registers 74 are also arranged to receive a write enable signal accum assertion of which causes data values from data registers 64 to be written into a corresponding data register 74 under the control of counter 62. The accum signal is arranged to cause data to be written from data registers 64 into data registers 74 in respect of each period over which it is desired to accumulate performance data. In the present example, it is assumed that it is desired to accumulate performance data over one second periods and so the accum signal is asserted once every second. The accum signal may be provided by any suitable conventional means.

In the preferred embodiment, the extraction apparatus 46 also includes a 2-to-1 selector switch 80 arranged to receive a first input from a respective one of the data registers 64 and a second input representing a zero data value. The selector switch 80 selects to output one or other of the first and second outputs depending on the setting of a control signal which, in the preferred embodiment comprises the signal accum. The output of the selector switch 80 is added to the performance data extracted from the received data signal for writing into a respective data register 64. The arrangement is such that, when performance data is extracted from a received data signal in respect of a given signal path, and when the accum signal is not asserted, then the current value stored in the data register 64 corresponding to the given path is added, via selector switch 80, to the newly extracted performance data, and the accumulated value is then stored in the corresponding data register 64. Under the control of counter 62, this process is carried out in respect of all signal paths and corresponding data registers 64. When the accum signal is asserted, under the control of counter 62, the contents of each data register 64—which comprises an accumulation of performance data values accumulated since the previous assertion of accum—is written to the respective data register 74, and the zero data value is added, via 2-to-1 selector switch 80, to the newly received performance data values in respect of each signal path. Thus, while accum is not asserted performance data is accumulated in respect of each signal path and stored in a respective data register 64. When accum is asserted, the accumulated performance data is transferred to a respective register 74 and the accumulation process begins again. The accumulated performance data in registers 74 may be made available in conventional manner to any apparatus (not shown), for example error reporting software, which requires the information.

In the preferred embodiment, the egress apparatus and ingress apparatus are arranged to support reverse signalling, and in particular TCM reverse signalling. Reverse signalling involves inserting one or more performance measures into the return path of a duplex signal. Under TCM, TC-RDT and ODI are normally inserted into the return path. By way of example, in FIG. 3 it is assumed that a data signal is received at ingress apparatus 30 and transported to egress apparatus 35 for output. The return signal path is received at ingress apparatus 32 and is transported to egress apparatus 33, 34 for output. The extraction apparatus 46 in egress apparatus 35 is arranged to extract performance information, in particular TC-RDI and ODI, from the received data signal and to communicate this data to the TCM source apparatus 40 of ingress apparatus 32 for insertion into the return signal path in normal manner.

Thus, the invention allows path performance information to be monitored at the egress of an network element without having to include relatively complex and expensive signal processing apparatus, including pointer processing apparatus, at the egress.

In a particularly preferred embodiment of the invention, the contents of data registers 54 of insertion apparatus 42 are set to zero after the respective performance information contained in the respective data registers 54 is inserted into section overhead. Also, when writing performance information into the data registers, the operation is performed by adding the new performance information to the existing contents of the respective data register 54 rather than overwriting the existing contents. This arrangement is to account for the possibility that the data frames carrying the incoming data signal received by the ingress apparatus are transmitted at a rate (hereinafter referred to as the path rate) which differs from the rate (hereinafter the system rate) at which the ingress apparatus creates data frames (sometimes known as system frames) for sending to the cross-connect. Performance information (in particular error counts) relating to the incoming data signal are calculated at the path rate, while the insertion apparatus inserts the performance information into section overhead at the system rate. By zeroing the data registers 54 after their contents are inserted into section overhead, the insertion apparatus accommodates the case where no performance information is supplied to the insertion apparatus by the TCM Sink apparatus within a given system frame. By adding new performance information to existing register contents rather than overwriting, the insertion apparatus accommodates the case where more than one set of performance information is received by the insertion apparatus from the TCM Sink apparatus within one system frame. To further accommodate the latter case, it is preferred to provide one or more additional bits in the data registers for storing the accumulated error count. For example, when implementing TCM in accordance with G.707, 4 bits would typically be provided in data registers 54 for storing the value for SEC. In the preferred embodiment, 5 bits is provided for storing SEC.

In the foregoing description, the preferred embodiment of the invention is described in the context of TCM. The invention is not, however, limited to use with TCM and may be used in any application which requires the monitoring of path overhead at an egress, or other part, of a network element which does not normally include the signal processing apparatus required to locate path overhead. For example, the invention may be used with other intermediate path performance monitoring techniques such as IPPM or path bit error performance monitoring using the B3 byte. Nor is the invention limited to monitoring N1 and B3 bytes of path overhead.

The foregoing description applies particularly to G.707 option 2 TCM on VC-4, VC-4nc and high order VC-3 or high order VC-3nc payloads, or equivalent. It will be understood that the invention is not limited to monitoring path overhead associated with high order data structures. The invention may be used with low order data structures, for example VTs or equivalent structures. By way of example, the V4 byte, which is located in a low order pointer, may conveniently be used to carry performance information from an ingress apparatus to an egress apparatus. An error count may be carried in, say, 3 bits of V4, a TCM error count in 3 bits, TC-RDI in 1 bit and ODI in 1 bit.

The invention is not limited to insertion of performance information into section overhead—any available component of a data frame which occupies a fixed position in the data frame may be used. For example, for a signal path provided by a high order VC-3 data structure, the VC-3 pointer column (which occurs after section overhead) occupies a fixed position with respect to the data frame and may be used to carry performance information in the manner described above. The byte below the TU-3H3 byte may be used to carry performance information.

In the foregoing description, the pointer processing apparatus 37 comprises conventional High Order Pointer Processing (HOPP) apparatus which creates a new data frame in which the received data signal can be transported through the network element 12. In embodiments (not illustrated) where the pointer processing apparatus comprising only pointer interpretation apparatus, no new data frame is created and the insertion apparatus is arranged to insert performance information into a fixed location, e.g. section overhead, of the received data frame.

In the foregoing description, the invention is described primarily in the context of an SDH network and mainly SDH terminology is used. A skilled person will understand that the invention applies equally to SONET networks and/or SONET/SDH networks.

The preferred embodiment of the invention is described herein in the context of a synchronous transport network, such as an SDH and/or SONET network. It will be understood that the invention is not limited to use with such. The invention may alternatively be used with any network in which data signals are transported by data frames, which frames comprise at least one component which occupies a non-fixed position with respect to the data frame and at least one component which occupies a fixed position with respect to the data frame. Typically, in such networks, pointer interpretation, or pointer processing, is required to locate the position of the or each non-fixed component of the data frame. The invention allows information which has been extracted from, or derived from, a non-fixed data frame component to be communicated between components, e.g. ingresses and egresses, of a network element without the need for each network element component to perform pointer interpretation, or other pointer processing.

The invention is not limited to the embodiments described herein which may be modified or varied without departing from the scope of the invention.

The invention claimed is:

1. A network element comprising:
   an ingress apparatus for receiving a data signal, the data signal being comprised of data frames, each data frame comprising at least one payload data structure for providing a respective signal path, and respective path overhead associated with said respective signal path, wherein said respective path overhead occupies a non-fixed position with respect to the data frame; and
   an egress apparatus arranged to receive data frames from said ingress apparatus; said egress apparatus and said ingress apparatus being located on a common network element,
   said ingress apparatus comprising
      a signal processing apparatus arranged to receive an incoming data frame that includes payload data, and to locate a position of the path overhead in the incoming data frame in respect of said respective signal path, and to create an internal data frame for transporting said payload data from said ingress apparatus to said egress apparatus;
      a monitoring apparatus arranged to extract information from the path overhead located by the signal processing apparatus; and
      an insertion apparatus arranged to receive, from said monitoring apparatus, information extracted from the path overhead of one or more signal paths, and being further arranged to insert said extracted information, or information derived therefrom, into a respective internal data frame component which occupies a fixed position in said internal data frame,
   the egress apparatus including an extraction apparatus arranged to extract said information inserted into internal data frame components by said ingress apparatus.

2. A network element as claimed in claim 1, wherein the signal processing apparatus comprises pointer interpretation apparatus.

3. A network element as claimed in claim 2, wherein the signal processing apparatus comprises pointer processing apparatus.

4. A network element as claimed in claim 3, wherein the pointer processing apparatus is arranged to create a new data frame for onward transmission of said data signal, the insertion apparatus being arranged to insert said extracted information, or information derived therefrom, into a component of said new data frame which occupies a fixed position in said new data frame.

5. A network element as claimed in claim 1, wherein the monitoring apparatus comprises an apparatus arranged to perform a TCM (Tandem Connection Monitoring) Sink function.

6. A network element as claimed in claim 1, wherein the information provided to the insertion apparatus by the monitoring apparatus comprises performance data.

7. A network element as claimed in claim 1, wherein said extracted information comprises a value representing the number of errors that have been detected in respect of the data signal from the signal source less IEC (Incoming Error Count) as defined in ITU-T G.707.

8. A network element as claimed in claim 1, wherein the insertion apparatus is arranged to insert said extracted information, or information derived therefrom, into overhead which occupies a fixed position in the data frame.

9. A network element as claimed in claim 8, wherein the data signal is comprised of SDH or SONET data frames and said extracted information, or information derived therefrom, is inserted into Section Overhead or Transport Overhead respectively.

10. A network element as claimed in claim 1, wherein the insertion apparatus comprises a respective memory location for each signal path in a received data signal, and a multi-to-1 selector switch arranged to insert a value contained in a selected one of said memory location into said fixed data frame component.

11. A network element as claimed in claim 10, wherein the insertion apparatus further includes a counter operable by a timing signal synchronised to the timing of the data frame into which the insertion apparatus is required to insert information, the counter being arranged to provide a control signal to said multi-to-1 selector switch for controlling which of said respective memory location is selected.

12. A network element as claimed in claim 1, wherein said extraction apparatus comprises a respective memory location for each signal path in a received data signal, the extraction apparatus being arranged to store the information extracted from received data frames in a respective memory location corresponding to the signal path to which the extracted information relates.

13. A network element as claimed in claim 12, wherein the extraction apparatus further includes a counter arranged to control the writing of extracted information into the respective memory location, the counter being operable by a timing signal synchronised to the receipt of data frames at the egress apparatus.

14. A network element as claimed in claim 12, wherein the extraction apparatus is arranged to accumulate the extracted information in respect of one or more signal paths over a fixed period by adding successive instances of extracted information to the respective memory location during said fixed period.

15. An ingress apparatus for receiving a data signal, comprising:
   the data signal being comprised of data frames, each data frame comprising at least one payload data structure for providing a respective signal path, and respective path overhead associated with said respective signal path, wherein said path overhead occupies a non-fixed position with respect to the data frame, a signal processing apparatus arranged to receive an incoming data frame that includes payload data, and to locate a position of the path overhead in the incoming data frame in respect of said respective signal path and to create an internal data frame for transporting said payload data from said ingress apparatus to an egress apparatus, said egress apparatus and said ingress apparatus being located on a common network element; and a path overhead monitoring apparatus arranged to extract information from the path overhead located by the signal processing apparatus, wherein the ingress apparatus further includes an insertion apparatus arranged to receive, from said monitoring apparatus, information extracted from the path overhead of one or more signal paths, and being further arranged to insert said extracted information, or information derived therefrom, into a respective internal data frame component which occupies a fixed position in said internal data frame, the egress apparatus including an extraction apparatus arranged to extract said information inserted into internal data frame components by said ingress apparatus.

16. A method comprising:
   transmitting within a network element information derived from path overhead, said network element comprising an ingress apparatus for receiving a data signal, the data signal being comprised of data frames, each data frame comprising at least one payload data structure for providing a respective signal path, and respective path overhead associated with said respective signal path, said respective path overhead occupying a non-fixed position with respect to the data frame, and said ingress apparatus including a signal processing apparatus, arranged for receiving, at said signal processing apparatus, an incoming data frame that includes payload data;

locating, at said signal processing apparatus, a position of the path overhead in the incoming data frame in respect of said respective signal path;

creating, at said signal processing apparatus, an internal data frame for transporting said payload data from said ingress apparatus to an egress apparatus, said egress apparatus and said ingress apparatus being located on a common network element;

extracting, at said signal processing apparatus, information from the path overhead of one or more signal paths;

inserting, at the ingress apparatus, said extracted information, or information derived therefrom, into a respective internal data frame component which occupies a fixed position in said internal data frame; and extracting, at said egress apparatus, said inserted information from said respective internal data frame component.

17. A computer program product comprising computer useable instructions for use in a network element comprising:

an ingress apparatus for receiving a data signal, the data signal being comprised of data frames, each data frame comprising at least one payload data structure for providing a respective signal path, and respective path overhead associated with said respective signal path, said respective path overhead occupying a non-fixed position with respect to said data frame, and said ingress apparatus including a signal processing apparatus arranged for receiving, at said signal processing apparatus, an incoming data frame that includes payload data;

locating the, at said signal processing apparatus, a position of the path overhead in the incoming data frame in respect of said respective signal path;

creating, at said signal processing apparatus, an internal data frame for transporting said payload data from said ingress apparatus to an egress apparatus, said egress apparatus and said ingress apparatus being located on a common network element;

extracting, at said signal processing apparatus, information from the path overhead of one or more signal paths;

inserting, at the ingress apparatus, said extracted information, or information derived therefrom, into a respective internal data frame component which occupies a fixed position in said internal data frame; and extracting, at said egress apparatus, said inserted information from said respective internal data frame component.

* * * * *